United States Patent
Seacat DeLuca et al.

(10) Patent No.: US 10,581,956 B2
(45) Date of Patent: *Mar. 3, 2020

(54) POSTING THE SAME RESPONSE FOR DUPLICATED CONTENT

(71) Applicant: International Business Machines Corporation, Armonk, NY (US)

(72) Inventors: Lisa Seacat DeLuca, Baltimore, MD (US); Jenny S. Li, Cary, NC (US); Dana L. Price, Surf City, NC (US); Aaron J. Quirk, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,605

(22) Filed: Feb. 27, 2019

(65) Prior Publication Data

US 2019/0199778 A1 Jun. 27, 2019

Related U.S. Application Data

(63) Continuation of application No. 15/220,961, filed on Jul. 27, 2016, now Pat. No. 10,250,675.

(51) Int. Cl.
*H04L 29/08* (2006.01)
*H04L 12/58* (2006.01)

(52) U.S. Cl.
CPC .............. *H04L 67/10* (2013.01); *H04L 51/02* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 8,515,894 | B2 | 8/2013 | Yu |
| 8,539,360 | B2 | 9/2013 | Angell et al. |
| 8,825,773 | B1 | 9/2014 | Gauvin |
| 9,098,819 | B1 | 8/2015 | Korula et al. |
| 10,250,675 | B2 | 4/2019 | Seacat DeLuca et al. |
| 2010/0262918 | A1 | 10/2010 | Angell et al. |
| 2010/0293560 | A1 | 11/2010 | Bland et al. |
| 2011/0010384 | A1 | 1/2011 | Luo et al. |

(Continued)

OTHER PUBLICATIONS

Kong, X. et al., "Inferring anchor links across multiple heterogeneous social networks", In Proc. of 22nd ACM Int'l. Conf. on Information & Knowledge Management (CIKM '13), ACM Oct. 27, 2013, pp. 179-188.

(Continued)

*Primary Examiner* — Thomas J Dailey
(74) *Attorney, Agent, or Firm* — Cuenot, Forsythe & Kim, LLC

(57) ABSTRACT

A first instance of a response, generated by a user, posted in a first social networking service can be detected. The first instance of the response can respond to a first instance of content shared with the user in the first social networking service. A second instance of the first content being shared with the user in the first social networking service or a second social networking service can be detected. Responsive to detecting the second instance of the first content being shared with the user, a second instance of the response can be automatically posted, the second instance of the response responding to the second instance of the first content on behalf of the user.

18 Claims, 4 Drawing Sheets

(56) References Cited

U.S. PATENT DOCUMENTS

2012/0323928 A1    12/2012   Bhatia
2013/0007634 A1    1/2013   Galvin, Jr. et al.
2013/0091221 A1    4/2013   Bennett
2013/0174031 A1    7/2013   Constantinou
2013/0318085 A1    11/2013   Pepper
2014/0032659 A1    1/2014   Marini et al.
2014/0067774 A1    3/2014   Wilson
2017/0075878 A1    3/2017   Jon et al.
2018/0034896 A1    2/2018   Seacat DeLuca et al.

OTHER PUBLICATIONS

IBM: List of IBM Patents or Patent Applications Treated as Related, 2 pg.
Seacat DeLuca et al., "Posting the Same Response for Duplicated Content", U.S. Appl. No. 15/220,961, filed Jul. 27, 2 016, 32 pages.

| User ID | Content ID | Hash ID | Content Provider | Social Networking Service | Description of Content | Share Time Stamp | Response Time Stamp | Emoji | Comment ? | Comment Details |
|---|---|---|---|---|---|---|---|---|---|---|
| John | post1234 | iwt87 2uyty wvek w23 | Andrew | Service #1 | Men Try Eyeliner | 8/10/15 7:50 PM | 8/12/15 9:29 PM | Like | Y | OMG, that looks painful |
| John | Post6789 | iwt87 2uyty wvek w23 | Mary | Service #2 | Men Try Eyeliner | 8/11/15 2:44 PM | 8/12/15 9:29 PM | Like (Auto) | Y (Auto) | OMG, that looks painful |
| John | Post5823 | iwt87 2uyty wvek w23 | Jim | Service #3 | Men Try Eyeliner | 8/15/15 11:21 AM | 8/15/15 11:21 AM | Like (Auto) | Y (Auto) | OMG, that looks painful |

FIG. 2

POSTING THE SAME RESPONSE FOR DUPLICATED CONTENT

BACKGROUND

The present invention relates to processing systems, and more specifically, to managing responses posted in social networks.

A social networking service is a platform to build social networks or social relations among people who share similar personal and career interests, activities, backgrounds or real-life connections. Using social networking services, people can share information with their friends, family and other contacts. Oftentimes people subscribe to more than one social networking services. For example, a particular user may subscribe to two, three or even more different social networking services. Thus, that user can access content shared by others via any of those social networking services.

SUMMARY

A method includes detecting a first instance of a response, generated by a user, posted in a first social networking service, the first instance of the response responding to a first instance of first content shared with the user in the first social networking service. The method also can include detecting a second instance of the first content being shared with the user in the first social networking service or a second social networking service. The method also can include, responsive to detecting the second instance of the first content being shared with the user, automatically posting, using a processor, a second instance of the response, the second instance of the response responding to the second instance of the first content on behalf of the user.

A system includes a processor programmed to initiate executable operations. The executable operations include detecting a first instance of a response, generated by a user, posted in a first social networking service, the first instance of the response responding to a first instance of first content shared with the user in the first social networking service. The executable operations also can include detecting a second instance of the first content being shared with the user in the first social networking service or a second social networking service. The executable operations also can include, responsive to detecting the second instance of the first content being shared with the user, automatically posting a second instance of the response, the second instance of the response responding to the second instance of the first content on behalf of the user.

A computer program includes a computer readable storage medium having program code stored thereon. The program code is executable by a processor to perform a method. The method includes detecting, by the processor, a first instance of a response, generated by a user, posted in a first social networking service, the first instance of the response responding to a first instance of first content shared with the user in the first social networking service. The method also can include detecting, by the processor, a second instance of the first content being shared with the user in the first social networking service or a second social networking service. The method also can include, responsive to detecting the second instance of the first content being shared with the user, automatically posting, by the processor, a second instance of the response, the second instance of the response responding to the second instance of the first content on behalf of the user.

BRIEF DESCRIPTION OF THE DRAWINGS

FIG. 2 is a diagram illustrating an example of a functional data structure that stores data corresponding to a response posted in a social networking service.

DETAILED DESCRIPTION

Figure 1:
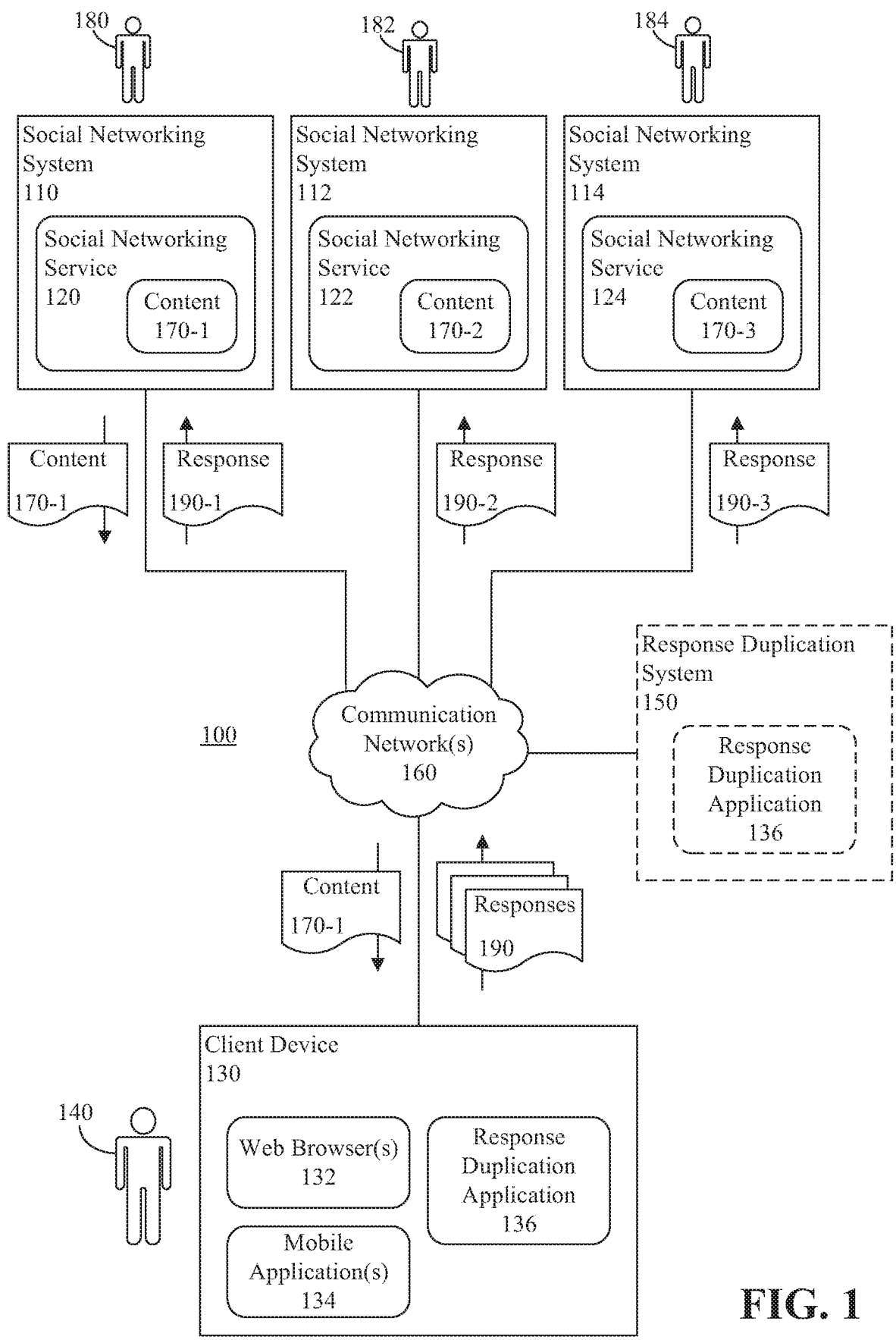
FIG. 1 is a block diagram illustrating an example of a computing environment.

The present invention relates to processing systems, and more specifically, to managing responses posted in social networking services. In accordance with arrangements described herein, a user can post, in a social networking service, a response replying or responding to a first post shared with the user in the social networking service. Other posts shared with the user in the social networking service, for example in or more other threads, may include content that is the same as content contained in the first post. The user's client device, or another device or system, can detect such other posts. Responsive to detecting such other posts, the client device (or other device or system) can duplicate the response to add the response to the other threads. Thus, the user can generate a single response, and that response can be automatically duplicated across other threads that have posts including content similar to the first post. This can save the user much time when perusing to, and responding to, posts in the social networking service.

In one arrangement, the above process can be extended across a plurality of disparate social networking services. For example, the user can post a response to a first post in a first social networking service, and if posts containing content that is the same as content contained in the first post are shared with the user in other social networking services, the user's response can be duplicated in those other social networking services.

Several definitions that apply throughout this document now will be presented.

As defined herein, the term "post," when used as a verb, means to publish in a thread of a social networking service.

As defined herein, the term "post," when used as a noun, means content posted in a thread of social networking service.

As defined herein, the term "content" means text, audio, one or more images, video, one or more emojis, one or more emoticons, one or more links (e.g., hyperlinks), or any combination of text, audio, one or more images, video, one or more emojis, one or more emoticons and/or one or more links.

As defined herein, the term "content instance," means an instance of content. In this regard, the same content may be posted more than once, and the content contained in each post is a "content instance."

As defined herein, the term "response," when used as a noun, means a post generated by a user responding to or replying to another post.

As defined herein, the term "response instance," means an instance of a response. In this regard, the same response may be posted in more than one thread, and each posting of the response is a "response instance."

As defined herein, the term "thread" means a sequence of related posts, including an initial posts and one or more responses.

As defined herein, the term "emoji" means a small digital image or icon used to express an idea, emotion, reaction, etc., in a post in a social networking service. Examples of an emoji include a like icon presented responsive to a user selecting a like button, a dislike icon presented responsive to a user selecting a dislike button, a star icon presented responsive to a user selecting a corresponding button, and so on.

As defined herein, the term "emoticon" means a representation of a facial expression formed by a combination of two or more ASCII characters (e.g., keyboard characters).

As defined herein, the term "social networking service" means an online service platform on which social networks or social relations are built among people who, for example, share interests, activities, backgrounds or real-life connections, and via which people can share information with one another. As the term "social networking service" is defined herein, a messaging service per se (e.g., an e-mail service, a text messaging service, or an instant messaging service) is not a social networking service, though a social networking service can include an e-mail messaging service, a text messaging service and/or an instant messaging service in addition to one or more social networking components.

As defined herein, the term "social networking system" means at least one processing system (e.g., server) including one or more processors and memory that provides one or more social networking services, for instance via one or more websites. As the term "social networking system" is defined herein, a messaging system per se (e.g., an e-mail system, a text messaging system, or an instant messaging system) is not a social networking system, though a social networking system can include an e-mail messaging system, a text messaging system and/or an instant messaging system in addition to one or more social networking components.

As defined herein, the term "response duplication system" means at least one processing system (e.g., server) including one or more processors and memory that provides response duplication services for one or more users.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a computing environment 100. The computing environment can include one or more social networking systems 110, 112, 114, each hosting at least one social networking service 120, 122, 124. The social networking services 120-124 can be provided by respective social networking applications executing in processing environments hosted by operating systems of the social networking systems 110-114.

The computing environment 100 also can include at least one client device 130. The client device 130 can include one or more web browsers 132 and/or mobile applications 134 executed by the client device 130, for example within a processing environment hosted by an operating system of the client device 130. The client device 130, optionally, can include a response duplication application 136 executed by the client device 130, for example within a processing environment hosted by the operating system of the client device 130. The response duplication application 136 can be configured to duplicate responses generated by a user 140 of the client device 130, as be described herein.

Optionally, for example in an arrangement in which the client device 130 does not include the response duplication application 136, the computing environment 100 can include the response duplication system 150. In this arrangement, the response duplication application 136 can execute in a processing environment hosted by an operating system of the response duplication system 150. Again, the response duplication application 136 can be configured to duplicate responses generated by the user 140 of the client device 130, as described herein.

In another arrangement, one or more of the social networking systems 110-114 can include the response duplication application 136. For example, the social networking system 110 can execute the response duplication application 136 to implement the processes described herein as being performed by the response duplication application 136. Such processes can be limited to content shared within the social networking service 120, or can be applied across the plurality of social networking services 120-124.

The client device 130, social networking system(s) 110-114 and, optionally, the response duplication system 150 can be communicatively linked via one or more communication networks 160. The communication network 160 is the medium used to provide communications links between various devices and data processing systems connected together within the computing environment 100. The communication network 160 may include connections, such as wire, wireless communication links, or fiber optic cables. The communication network 160 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

In operation, a user 180 or another entity (e.g., a website, another system, another service, etc.) using the social networking service 120 can share with the user 140 a post including content 170-1. In this manner, the user 180 (or other entity) can share the content 170-1 with the user 140. For the remainder of this description, reference will be made to the user 180 as sharing the content 170-1, but the present arrangements are not limited in this regard.

The content 170-1 can be a first instance of particular content shared with the user 140. The post being shared can be a post starting a new thread or a post to an existing thread. The content 170-1 can be content generated by the user 180 or content copied by the user 180. For example, the user 180 can choose to share a post generated by another user, and cause that post to be shared on behalf of the user 180, as is known in the art. When sharing the post, the user 180 can, but need not, specifically indicate with whom the post is to be shared. For instance, by default, any posts shared by the user 180 can be shared with contacts, or one or more specific groups of contacts, of the user 180 in the social networking service 120, or shared with other user's following the user 180 in the social networking service 120. By way of example, the user can generate the post, or cause the post to be copied from another post, to a wall of the user 180 or a wall of the user 140.

The user 140 may generate a response 190-1 to the content instance 170-1 shared by the user 180 in the post. The user 140 can generate the response 190-1 using the web browser 132 or the mobile application 134, as is known in the art. For example, the user can access and participate in the social networking service 120 using the web browser 132 and/or the mobile application 134. The response duplication application 136 can monitor responses generated by the user 140, including the response 190.

Responsive to the user 140 posting the response 190-1 to the social networking service 120, the response duplication application 136 can store to a functional data structure (e.g., a data table in a database) a variety of corresponding data 210. An example of the functional data structure is depicted in FIG. 2 as a data table 200. The response duplication application 136 can create a record in the data table 200 and store the data 210 in the record responsive to the user posting the response 190-1.

The data 210 can include a user identifier field 220 that includes a user identifier identifying the user 140. The data 210 also can include a content identifier field 222 that includes a content identifier that identifies the content, for example a particular post via which the content 170-1 was shared. The data 210 also can include a hash identifier field 224 that includes a unique hash identifier generated for the content 170-1. The hash identifier can be, for example, a unique hash value. As known in the art, a hash value can be generated using a hash function to map data of an arbitrary size to data of a much smaller value, for example a value having a fixed size. Thus, a hash function can be performed on the instance of the content 170-1 to generate the unique hash value. The same hash function can be performed on other instances of the content 170 (e.g., 170-2, 170-3 of FIG. 1), in which case the same unique hash value will be generated for those other instances of the content 170.

The data 210 also can include a user identifier field 226 that includes a user identifier for the user 180 that shared the content 170-1, and a social networking service field 228 that includes an identifier for the social networking service 120 via which the content 170-1 is shared with the user 140. The data 210 also can include a content description field 230 that includes a description of the content 170-1. The description, for example, can be a description contained in the content 170-1 or a description entered in the post that refers to the content 170-1. For instance, the content 170-1 can include an image and a description of the image, and the description 230 can include the description of the image.

The data 210 also can include a share time stamp field 232 that includes a time stamp indicating when the content 170-1 is shared with the user 140, and a response time stamp field 234 that includes a time stamp indicating when the user 140 generated the response 190-1. The data 210 also can include an emoji indicator field 236 that includes data indicating whether the response 190-1 includes at least one emoji and, if so, which emoji(s) the response 190-1 includes. In illustration, if the response 190-1 includes a reaction emoji (e.g., a "Like" emoji) selected by the user 140, the emoji indicator field 236 can include data identifying the reaction emoji. The data 210 also can include a comment field 238 that includes data (e.g., "yes" or "no", "0" or "1," etc.) indicating whether the response 190-1 includes a comment. The data 210 also can include comment details field 240 that include text contained in the comment. The comment detail field 240 also can include links to other types of content that may have been included in the response 190-1, which may be stored in the same functional data structure or another data structure.

As will be described, the response duplication application 136 can automatically duplicate additional instances 190-2, 190-3 of the response 190 responsive to detecting other instances 170-2, 170-3 of the content 170 shared with the user 140 in one or more of the social networking services 120-124. For each of the other response instances 190-2, 190-3, the response duplication application 136 can create a respective record in the data table 200 and store in the record respective data 250, 260. Each record can include corresponding data fields 220-240 similar to the data fields 220-240 previously described. Because the response instances 190-2, 190-3 are automatically generated, the response duplication application 136 can indicate in the data fields 236, 238 corresponding to the data 250, 260 that the emoji(s) and comments are automatically included in the responses instances 190-2, 190-3 by the response duplication application 136.

Referring again to FIG. 1, the response duplication application 136 can monitor the social networking services 120-124 for posts sharing content with the user 140 and identify content contained in such posts. For example, the response duplication application 136 can use the aforementioned hash function to generate a hash value for the content contained in each of the posts shared with the user 140 to generate unique hash values for each content. The response duplication application 136 can generate the hash values in real time as the content is detected. The response duplication application 136 can, for each of the content shared with the user 140, store, in real time, to a functional data structure (e.g., a data table in a database) the respective hash value, a content identifier and a social networking service identifier. The content identifier can be an identifier indicating the post containing the content and the social networking service identifier can identify the social networking service in which the post is posted. The functional data structure can be the data table 200 described for FIG. 2, or another functional data structure.

Further, the response duplication application 136 can, in real time, compare each of generated the hash values to other hash values contained in the data table 200. Responsive to the hash value generated for particular content matching another has value contained in the data table 200 (e.g., the hash values are the same values), the response duplication application 136 can determine that the content is another instance of the content identified in the data table 200.

In illustration, the user 182 can post to the social networking service 122 a post including another instance 170-2 of the content 170, and that post can be shared with the user 140. Based on the hash value generated for the content instance 170-2, the response duplication application 136 can determine that the content instance 170-2 is the same content 170 as the content instance 170-1. Similarly, the response duplication application 136 can determine that the content instance 170-3 shared with the user 140 by the user 184 in the social networking system 114 is the same content 170 as the content instance 170-1. Moreover, another user may create a post in the social networking system 110 sharing another instance (not shown) of the same content 170 with the user 140. In each of these cases, the response duplication application 136 can determine that those other content instances are the same content 170 as the content instance 170-1.

Responsive to detecting the content instances 170-2, 170-3, the response duplication application 136 can, in real time, duplicate the response 190 and post respective instances 190-2, 190-3 of the response 190 in each of the threads having the instances of the content 170-2, 170-3 shared with the user. As noted, in response to posting the response instances 190-2, 190-3, the response duplication application 136 can, for each response instance 190-2, 190-3, add a record to the data table 200. Each record can include the previously discussed fields 220-240 and can be added to the data table 200 in real time.

The different social networking services 120-124 may support different types of emojis, or some social networking systems may not support emojis at all. For example, the social networking service 120 may support a "Like" emoji whereas the social networking service 122 may support a star emoji, and the social networking service 124 may not support any emojis. Notwithstanding, the response duplication application 136 can replace, in various response instances 190-1, 190-2, 190-3, unsupported emojis with other emojis or emoticons, or replace emoticons with supported emojis.

By way of example, assume the response 190 includes a "Like" emoji (e.g., a "Like" indicator that is processed by the social networking service 120 to present a "Like" emoji), and the response instance 190-1 is posted to the social networking service 120. Also assume that the social networking service 122 does not support "Like" emojis, and instead supports "Star" emojis. When duplicating the response 190 to generate response instance 190-2, the response duplication application 136 can determine such circumstances, identify the "Like" emoji in the response instance 190-1, and determine that a "Star" emoji is equivalent to a "Like" emoji. For instance, the response duplication application 136 can access a data table indicating different emojis that are equivalent to one another. Accordingly, the response duplication application 136 can identify and select the "Star" emoji and replace, in the response instance 190-2, the "Like" emoji with the "Star" emoji. For instance, the response duplication application 136 can replace a "Like" indicator with an indicator that is processed by the social networking service 122 to present a "Star" emoji.

Further, the response duplication application 136 can determine that the social networking service 124 does not support emojis and, in the response instance 190-2, replace the "Like" emoji with an emoticon. For example, the response duplication application 136 can access a data table indicating emoticons that are equivalent to various emojis, and identify and select the emoticon from that data table.

In another example, assume the response instance 190-1 includes an emoticon, and the response duplication application 136 determines that the social networking system 112 supports emojis. The response duplication application 136 can, in the response instance 190-2, replace the emoticon with an equivalent emoji. For instance, the response duplication application 136 can access the data table indicating emoticons that are equivalent to various emojis, and identify and select an emoji that is equivalent to the emoticon from that data table.

At this point it should be noted that the content instances 170-2, 170-3 can be shared with the user 140 prior to, when, or after the content instance 170-1 is shared with the user. Thus, the user's response 190 can be duplicated for a content instance 170-2 that may have been shared with the user prior to the content instance 170-1 being shared with the user 140 and for a content instance 170-3 that may have been shared with the user after the content instance 170-1 being shared with the user. In one arrangement, the response duplication application 136 can include user preferences that the user 140 may set. The user preferences may indicate time frames applicable to posted content 170 and responses 190. In illustration, a user preference may indicate to only generate response instances 190-2, 190-3 for content instances 170-2, 170-3 shared with the user 140 within a specified time frame of the content instance 170-1 being shared with the user 140, only generate response instances 190-2, 190-3 for content instances 170-2, 170-3 shared with the user 140 within a specified time frame of the first instance 170-1 of the response being generated, and so on. Further, the response duplication application 136 can delete from the data table 200 records corresponding to response instances 190-1, 190-2, 190-3 and or content instances 170-1, 170-2, 170-3 that fall outside of the specified time frame. This can help to keep the data table 200 from growing excessively large.

In one aspect of the present arrangements, the user preferences can indicate whether the user 140 is to be prompted to authorize duplication of responses 190 and, optionally, for which social networking systems 110-114 the user must authorize the duplication. In illustration, responsive to identifying one or more instances of the content 170-2, 170-3 that are the same content as the content instance 170-1, or responsive to the user generating the response 190-1, the response duplication application 136 can, via a user interface of the client device 130, indicate to the user 140 the posts containing the content instances 170-2, 170-3, including the users 182, 184 who posted the respective content instances 170-2, 170-3. The response duplication application 136 also can prompt the user 140 to select which, if any, of the posts the user 140 chooses to have the response 190 duplicated. Responsive to the user selecting one or more of the posts, the response duplication application 136 can duplicate the response 190 to generate the response instances 190-2, 190-3 for the selected posts and post the response instances 190-2, 190-3 to the respective threads containing the posts.

In one arrangement, the response duplication application 136 can present to the user 140 the response instances 190-2, 190-3 prior to posting them, and provide the user an opportunity to modify the response instances 190-2, 190-3 before they are posted. For example, if the response instance 190-1 only contains content that is a reaction (e.g., a "Like") the user can be provided an opportunity to enter one or more user inputs to add additional content to one or more the response instances 190-2, 190-3. For example, the user may choose to add comments to instances of responses 190-2, 190-3 being shared with certain users 182-184. Responsive to receiving corresponding user inputs, the response duplication application 136 can add the additional content to one or more of the response instances 190-2, 190-3.

In another aspect of the present arrangements, the user 140 can specify, in the user preferences, one or more other users 180-184 for whom the response duplication application 136 is to automatically generate and post duplicated responses (e.g., response instances 190-2, 190-3) and one or more other users 180-184 for whom the response duplication application 136 is to prompt the user to choose whether to generate and post the duplicated responses. For example, the user 140 may specify that responses 190 being duplicated for posts generated by close friends are to be presented to the user 140 to allow the user to customize the instances of the responses 190-2, 190-3 being shared with those friends. Responses for other users 182-184 who are not close friends can be generated and posted without requiring user interaction with the response instances 190-2, 190-3.

In another arrangement, the user preferences also can specify how responses to content shared by a user are handled. For example, if the user 180 posts the same content 170 in each of the social networking services 120-124, the user 180 may not see responses by the user 140 duplicated in each of the social networking services 120-124 the content 170 is posted. A response duplication application executed for the user 180 (e.g., in the client device of the user 180, or the response duplication application 136 in the response duplication system 150 or one or more of the social networking systems 110-114) can add to the at least the first content instance 170-1 an indicator indicating that responses to the content are not to be duplicated. When processing the content instance 170-1, the response duplication application 136 can add to the data table 200 a duplication data indicator indicating that the response 190 is not to be duplicated. Thus, only one instance 190-1 of the response need be posted. Further, even if the response instances 190-1, 190-2, 190-3 are posted in response to the respective content instances 170-1, 170-2, 170-3, the response duplication application executed for the user 180 can interface with the social networking services 122, 124, or the web browser(s) or the mobile application(s) executing the client device of the user 180, to prevent the response instances 190-2, 190-3 from being presented to the user 180.

In another aspect of the present arrangements, the response duplication application 136 can duplicate responses to content presented by the user for whom the response duplication application 136 is executed. For example, assume that the user 184 posts the content instance 170-3 and receives a number of responses that are below a threshold level because other users 140, 182 have already posted responses to the content instance 170-1 posted by the user 180. The response duplication application can identify responses posted by the other users 140, 182 in response to the content instances 170-1, 170-2, and duplicate those responses to post response instances in the thread containing the content 170-3. Accordingly, the user 184 can see feedback posted for other instances of the same content 170.

In one arrangement, whether to duplicate responses in this manner can be based on posting activity of the user 184. For example, if the user 184 usually does not post content from a news feed (e.g., posts of content from the news feed by the user 184 over a particular time frame is below a threshold level), but posts a content instance 170-3 of the news feed, it may mean that the content 170 is especially important to the user 184. Thus, the response duplication application executed for the user 184 can duplicate responses posted by the users 140, 182 for the content instances 170-1, 170-2. If, however, the user 184 usually does post content from the news feed (e.g., over the threshold level for the particular time frame), it may mean that the content 170 is not especially important to the user 184. Thus, the response duplication application need not duplicate such responses. In this regard, the response duplication application can be configured to interface with one or more other systems, for example a cognitive system (e.g., IBM® Watson), to perform processing on data generated by the response duplication application to make determinations described herein.

In an arrangement in which the response duplication application 136 is executed by the client device 130, the response duplication application 136 system can interface with the web browser(s) 132 and or mobile application(s) 134, for example using a plugin installed in the web browser(s) 132 and or mobile application(s) 134, to monitor the social networking services 120-124. For example, the response duplication application 136 system can monitor the social networking services 120-124 when the user is logged into the social networking services 120-124. In another arrangement, the response duplication application 136 can access from the web browser(s) 132 and or mobile application(s) 134 authentication credentials of the user 140 (e.g., user name and password) and use the authentication credentials to access the social networking services 120-124 and monitor for posts shared with the user. Such process can be performed as a background task or service executing on the client device 130, thus not requiring the user to log into the social networking services 120-124, or requiring any other interaction from the user 140, to perform processes for duplicating responses.

In an arrangement in which the response duplication application 136 is executed by the response duplication system 150, the user 140 can provide to the response duplication application 136 user information that may be used by the response duplication application 136 to monitor content instances 170-1, 170-2, 170-3 shared with the user 140. For example, the user 140 can create a user profile including the user's authentication credentials for the social networking services 120-124. In such an arrangement, the response duplication application 136 can monitor the social networking services 120-124 and duplicate responses using the user's credential, regardless of whether the user is logged into the social networking services 120-124. The social networking services 120-124 can be configured to allow for the response duplication application 136 to perform the post monitoring and response duplication on behalf of the user.

In an arrangement in which the response duplication application 136 is executed by one or more of the social networking systems 110-114, each instance of the response duplication application 136 can perform the response duplication processes for the respective social networking service 120-124 and/or the respective instances of the response duplication application 136 can interface with one another to provide response duplication processes across each of the social networking systems 110-114.

Figure 3:
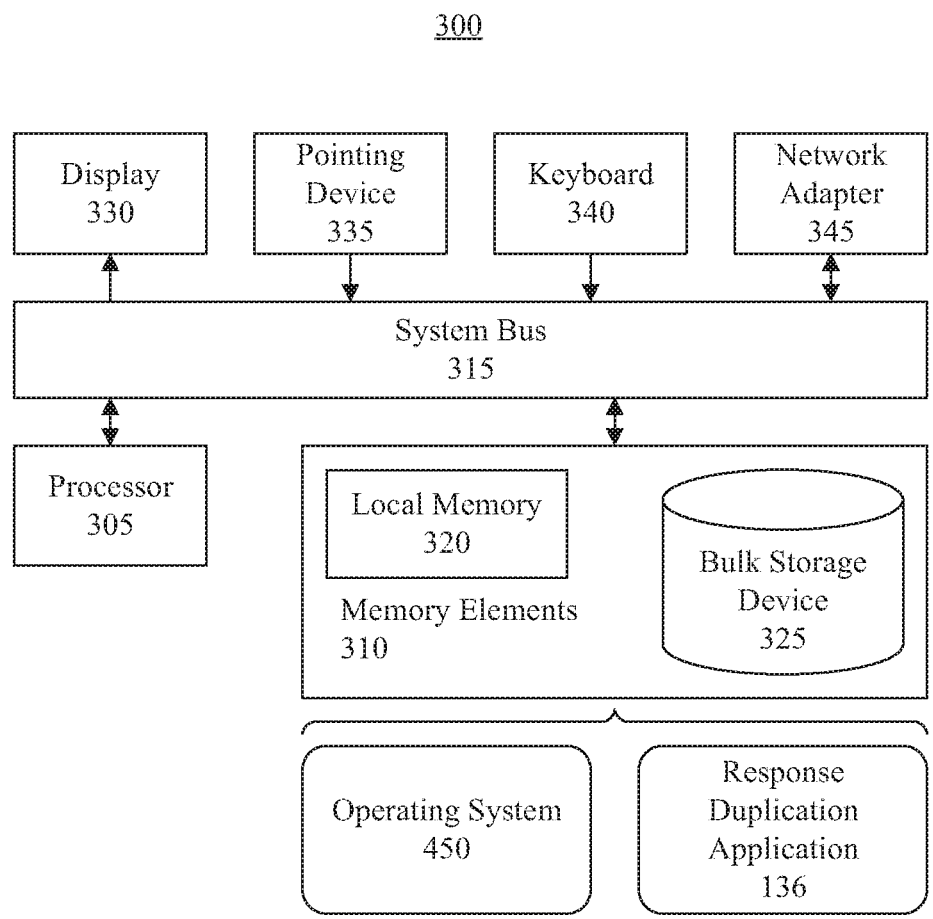
FIG. 3 is a block diagram illustrating example architecture for a data processing system.

FIG. 3 depicts a block diagram of a data processing system 300 configured to duplicate responses in accordance with an arrangement disclosed within this specification. The data processing system 300 can be implemented as the client device 130, the response duplication system 150 or a social networking system 110-114 of FIG. 1.

The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and, optionally, a keyboard 340 can be coupled to the data processing system 300. The I/O devices can be coupled to the data processing system 300 either directly or through intervening I/O controllers. For example, the display 330 can be coupled to the data processing system 300 via a graphics processing unit (GPU), which may be a component of the processor 305 or a discrete device. One or more network adapters 345 also can be coupled to data processing system 300 to enable the data processing system 300 to become coupled to other systems, computer systems, remote printers, and/or remote storage devices through intervening private or public networks. Modems, cable modems, transceivers, and Ethernet cards are examples of different types of network adapters 345 that can be used with the data processing system 300.

As pictured in FIG. 3, the memory elements 310 can store the components of the data processing system 300, for example an operating system 450 and the response duplication application 136. Being implemented in the form of executable program code, these components of the data processing system 300 can be executed by the data processing system 300 and, as such, can be considered part of the data processing system 300. Moreover, the operating system 450 and the response duplication application 136 are functional data structures that impart functionality when employed as part of the data processing system 300.

Figure 4:
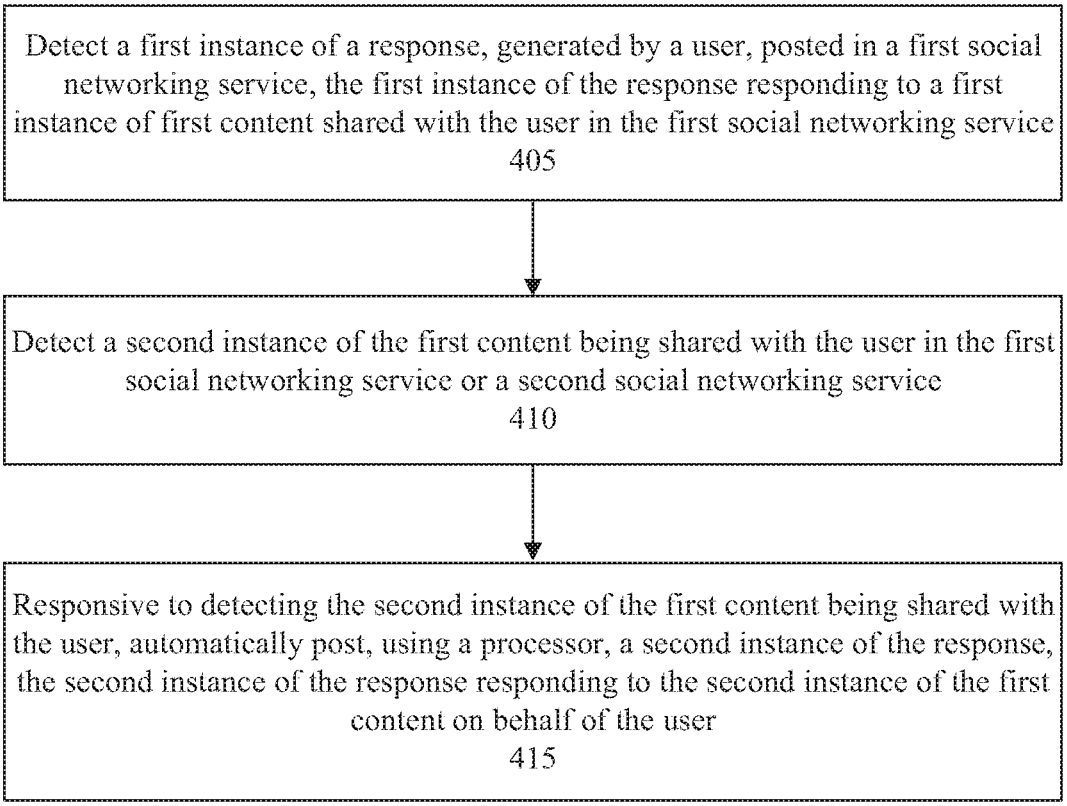
FIG. 4 is a flow chart illustrating an example of a method of duplicating responses.

FIG. 4 is a flow chart illustrating an example of a method of duplicating responses. At step 405, the response duplication application 136 can detect a first instance of a response, generated by a user, posted in a first social networking service, the first instance of the response responding to a first instance of first content shared with the user in the first social networking service. At step 410, the response duplication application 136 can detect a second instance of the first content being shared with the user in the first social networking service or a second social networking service. At step 415, the response duplication application 136 can, responsive to detecting the second instance of the first content being shared with the user, automatically post, using a processor, a second instance of the response, the second instance of the response responding to the second instance of the first content on behalf of the user.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting a first instance of a response, generated by a user, posted in a first social networking service, the first instance of the response responding to a first instance of first content shared with the user in the first social networking service;
   detecting a second instance of the same first content being shared with the user in the first social networking service or a second social networking service;
   responsive to detecting the second instance of the same first content being shared with the user, automatically posting, using a processor, a second instance of the response, the second instance of the response responding to the second instance of the first content on behalf of the user;
   identifying a post, including a first instance of second content, posted by the user to at least the first social networking service;
   determining that a number of responses to the to the post are below a threshold level; and
   responsive to determining that the number of responses to the to the post are below the threshold level:
      identifying at least a second instance of the second content posted by at least one other user in the first social networking service or the second social networking service;
      identifying a first instance of a response to the second instance of the second content; and
      posting the first instance of the response to the second instance of the second content.

2. The method of claim 1, further comprising:
   prior to posting the second instance of the response, presenting the second instance of the response to the user;
   receiving one or more user inputs to add additional content to the second instance of the response; and
   responsive to receiving the one or more user inputs, adding the additional content to the second instance of the response.

3. The method of claim 1, wherein the second instance of the response is posted in the second social networking service, the method further comprising:
   identifying a first emoji contained in the first instance of the response;
   determining whether the first emoji is supported in the second social networking service; and
   responsive to determining that the first emoji is not supported in the second social networking service, identifying a second emoji that is equivalent to the first emoji and that is supported in the second social networking service, and replacing, in the second instance of the response, the first emoji with the second emoji.

4. The method of claim 1, wherein the second instance of the response is posted in the second social networking service, the method further comprising:
   identifying an emoji contained in the first instance of the response;
   determining whether the emoji is supported in the second social networking service; and
   responsive to determining that the emoji is not supported in the second social networking service, identifying an emoticon that is equivalent to the emoji, and replacing, in the second instance of the response, the emoji with the emoticon.

5. The method of claim 1, wherein the second instance of the response is posted in the second social networking service, the method further comprising:
   identifying an emoticon contained in the first instance of the response;
   determining whether emojis are supported in the second social networking service; and
   responsive to determining that the emojis are supported in the second social networking service, identifying an emoji that is equivalent to the emoticon, and replacing, in the second instance of the response, the emoticon with the emoji.

6. The method of claim 1, further comprising:
   responsive to detecting the first instance of the response, generated by the user, posted in the first social networking service, storing to a functional data structure a record including a first identifier identifying the response and at least a second identifier identifying the first instance of the first content;
   wherein detecting the second instance of the first content being shared with the user in the first social networking service or the second social networking service comprises determining that a third identifier identifying the second instance of the first content matches the first identifier identifying the first instance of the first content.

7. The method of claim 1, wherein the response comprises at least one form of content selected from a group consisting of text, an image, a video and a reaction.

8. A system, comprising:
   a processor programmed to initiate executable operations comprising:
   detecting a first instance of a response, generated by a user, posted in a first social networking service, the first instance of the response responding to a first instance of first content shared with the user in the first social networking service;
   detecting a second instance of the same first content being shared with the user in the first social networking service or a second social networking service;
   responsive to detecting the second instance of the same first content being shared with the user, automatically posting a second instance of the response, the second instance of the response responding to the second instance of the first content on behalf of the user;
   identifying a post, including a first instance of second content, posted by the user to at least the first social networking service;
   determining that a number of responses to the to the post are below a threshold level; and
   responsive to determining that the number of responses to the to the post are below the threshold level:
      identifying at least a second instance of the second content posted by at least one other user in the first social networking service or the second social networking service;
      identifying a first instance of a response to the second instance of the second content; and
      posting the first instance of the response to the second instance of the second content.

9. The system of claim 8, the executable operations further comprising:
prior to posting the second instance of the response, presenting the second instance of the response to the user;
receiving one or more user inputs to add additional content to the second instance of the response; and
responsive to receiving the one or more user inputs, adding the additional content to the second instance of the response.

10. The system of claim 8, wherein the second instance of the response is posted in the second social networking service, the executable operations further comprising:
identifying a first emoji contained in the first instance of the response;
determining whether the first emoji is supported in the second social networking service; and
responsive to determining that the first emoji is not supported in the second social networking service, identifying a second emoji that is equivalent to the first emoji and that is supported in the second social networking service, and replacing, in the second instance of the response, the first emoji with the second emoji.

11. The system of claim 8, wherein the second instance of the response is posted in the second social networking service, the executable operations further comprising:
identifying an emoji contained in the first instance of the response;
determining whether the emoji is supported in the second social networking service; and
responsive to determining that the emoji is not supported in the second social networking service, identifying an emoticon that is equivalent to the emoji, and replacing, in the second instance of the response, the emoji with the emoticon.

12. The system of claim 8, wherein the second instance of the response is posted in the second social networking service, the executable operations further comprising:
identifying an emoticon contained in the first instance of the response;
determining whether emojis are supported in the second social networking service; and
responsive to determining that the emojis are supported in the second social networking service, identifying an emoji that is equivalent to the emoticon, and replacing, in the second instance of the response, the emoticon with the emoji.

13. The system of claim 8, the executable operations further comprising:
responsive to detecting the first instance of the response, generated by the user, posted in the first social networking service, storing to a functional data structure a record including a first identifier identifying the response and at least a second identifier identifying the first instance of the first content;
wherein detecting the second instance of the first content being shared with the user in the first social networking service or the second social networking service comprises determining that a third identifier identifying the second instance of the first content matches the first identifier identifying the first instance of the first content.

14. A computer program product comprising a computer readable storage medium having program code stored thereon, the program code executable by a processor to perform a method comprising:

detecting, by the processor, a first instance of a response, generated by a user, posted in a first social networking service, the first instance of the response responding to a first instance of first content shared with the user in the first social networking service;
detecting, by the processor, a second instance of the same first content being shared with the user in the first social networking service or a second social networking service; and
responsive to detecting the second instance of the same first content being shared with the user, automatically posting, by the processor, a second instance of the response, the second instance of the response responding to the second instance of the first content on behalf of the user;
identifying, by the processor, a post, including a first instance of second content, posted by the user to at least the first social networking service;
determining, by the processor, that a number of responses to the to the post are below a threshold level; and
responsive to determining that the number of responses to the to the post are below the threshold level:
identifying, by the processor, at least a second instance of the second content posted by at least one other user in the first social networking service or the second social networking service;
identifying, by the processor, a first instance of a response to the second instance of the second content; and
posting, by the processor, the first instance of the response to the second instance of the second content.

15. The computer program product of claim 14, the method further comprising:
prior to posting the second instance of the response, presenting the second instance of the response to the user;
receiving one or more user inputs to add additional content to the second instance of the response; and
responsive to receiving the one or more user inputs, adding the additional content to the second instance of the response.

16. The computer program product of claim 14, wherein the second instance of the response is posted in the second social networking service, the method further comprising:
identifying a first emoji contained in the first instance of the response;
determining whether the first emoji is supported in the second social networking service; and
responsive to determining that the first emoji is not supported in the second social networking service, identifying a second emoji that is equivalent to the first emoji and that is supported in the second social networking service, and replacing, in the second instance of the response, the first emoji with the second emoji.

17. The computer program product of claim 14, wherein the second instance of the response is posted in the second social networking service, the method further comprising:
identifying an emoji contained in the first instance of the response;
determining whether the emoji is supported in the second social networking service; and
responsive to determining that the emoji is not supported in the second social networking service, identifying an emoticon that is equivalent to the emoji, and replacing, in the second instance of the response, the emoji with the emoticon.

18. The computer program product of claim 14, wherein the second instance of the response is posted in the second social networking service, the method further comprising:
- identifying an emoticon contained in the first instance of the response;
- determining whether emojis are supported in the second social networking service; and
- responsive to determining that the emojis are supported in the second social networking service, identifying an emoji that is equivalent to the emoticon, and replacing, in the second instance of the response, the emoticon with the emoji.

\* \* \* \* \*